(12) United States Patent
Rugar

(10) Patent No.: US 9,168,600 B2
(45) Date of Patent: Oct. 27, 2015

(54) RASP FOR SMOOTHING IRREGULARLY SHAPED SURFACES

(76) Inventor: John Rugar, New Fairfield, CT (US)

(*) Notice: Subject to any disclaimer, the term of this patent is extended or adjusted under 35 U.S.C. 154(b) by 104 days.

(21) Appl. No.: 12/977,726

(22) Filed: Mar. 11, 2011

(65) Prior Publication Data
US 2012/0230782 A1 Sep. 13, 2012

(51) Int. Cl.
| B23D 71/00 | (2006.01) |
| B23D 71/04 | (2006.01) |
| B23D 71/06 | (2006.01) |
| A01L 15/00 | (2006.01) |
| B27G 17/06 | (2006.01) |

(52) U.S. Cl.
CPC ............... *B23D 71/06* (2013.01); *A01L 15/00* (2013.01); *B23D 71/04* (2013.01); *B27G 17/06* (2013.01); *Y10T 407/18* (2015.01)

(58) Field of Classification Search
CPC .......... B23D 71/00; B23D 71/04; B23D 71/06
USPC .................................. 407/29.1, 29.15, 29.14
See application file for complete search history.

(56) References Cited

U.S. PATENT DOCUMENTS

| 76,618 | A | 4/1868 | Fisher |
| 324,389 | A | 8/1885 | Judge |
| 410,809 | A | 9/1889 | Snowden |
| 621,378 | A | 3/1899 | Shoemaker |
| 677,158 | A | 6/1901 | Koenig |
| 858,171 | A | 6/1907 | Getaz |
| 901,290 | A | 10/1908 | Gardner |
| 1,011,916 | A | 12/1911 | Carlson |
| 1,017,774 | A | 2/1912 | Leavitt |
| 1,100,544 | A | 6/1914 | Densmore |
| 1,104,561 | A * | 7/1914 | Simmons ..................... 407/29.1 |
| 1,106,536 | A * | 8/1914 | Barker ......................... 407/29.1 |
| 1,178,310 | A | 4/1916 | Getaz |
| 1,616,403 | A * | 2/1927 | Womack ...................... 407/29.1 |
| 2,103,499 | A | 7/1935 | Seifried |
| 2,549,570 | A | 4/1946 | Bryan |
| 2,448,967 | A | 6/1946 | Fleshman |
| 2,768,568 | A | 8/1953 | Civitelli |
| 2,949,661 | A | 10/1955 | Credit |
| 3,086,277 | A * | 4/1963 | Hardy ........................ 407/29.13 |
| 4,046,109 | A | 9/1977 | Miller |
| 4,219,915 | A | 9/1980 | Scott |
| 4,598,447 | A | 7/1986 | Whyde |
| 5,317,839 | A * | 6/1994 | Anderson ...................... 451/558 |
| 5,586,842 | A * | 12/1996 | Bae et al. ..................... 407/29.14 |
| 5,919,007 | A | 7/1999 | Brown |
| 6,261,031 | B1 * | 7/2001 | Stipe et al. ................. 407/29.15 |
| 7,341,407 | B2 | 3/2008 | Boorer |
| 7,617,608 | B2 * | 11/2009 | Zakarian ........................ 30/514 |
| 7,628,216 | B2 | 12/2009 | Tomlinson |
| 8,051,518 | B2 * | 11/2011 | Massaro ........................... 7/161 |
| 2003/0035693 | A1 | 2/2003 | Chalfant |

FOREIGN PATENT DOCUMENTS

JP 04344836 10/2009

* cited by examiner

*Primary Examiner* — Will Fridie, Jr.

(57) ABSTRACT

A surface shaping rasp for use in removing material to shape or smooth a substrate such as an animal's hoof. The rasp has a plurality of blades spaced sufficiently apart to provide relatively rigid surface yet providing enough open space to allow passage of removed material and placed in a holding frame. The rasp is especially useful for smoothing rough and irregularly shaped surfaces such as after trimming an animal's hoof.

3 Claims, 5 Drawing Sheets

RASP FOR SMOOTHING IRREGULARLY SHAPED SURFACES

FIELD OF THE INVENTION

The present invention relates to an improved cutting or abrading tool used to remove relatively small amounts of material from a substrate. The improved tool s useful in shaping and smoothing irregular, rough, or curved substrates such as an animal's hoof. The tool is generally hand held but could be adapted for use with a powered tool.

BACKGROUND OF THE INVENTION

A rasp is generally considered to be a special type of file. A rasp is typically used to smooth or shape a relatively soft substrate, such as wood or an animal's hoof. A rasp removes a relatively small amount of material. more than a typical file, but less than a saw, knife, or hoof nippers. Shaping and smoothing an animal's hoof presents some difficult challenges. In trimming an animal's hoof material is usually cut off with another tool. Then the hoof must be smoothed out and, if a shoe is to be attached, must also be leveled or flattened. The surface to be smoothed and shaped is fairly rough and includes at least one generally curved surface. A solid rasp has the problem of filling up with removed material preventing it from removing a sufficient amount of material efficiently. In the past some rasps have been designed with blade-like structures that are either too flexible or too closely spaced to allow material to pass therebetween. More traditional rasps use another type of cutting edge. A flat surface has small portions pushed up leaving a divot in the flat surface and a rounded or triangular mound having a flat side that presents a cutting edge when moved in one direction. The present invention overcomes these problems as set forth below.

An early example of a multi-bladed rasp is U.S. Pat. No. 324,389 issued to Judge and Clayton. This rasp teaches the use of a plurality of parallel blades spaced evenly apart and held in position by a threaded fastener. This rasp is unique in that the blades can pivot about one of their ends. Another early example is U.S. Pat. No. 410,809 issued to Snowden. The Snowden plane has a plurality of parallel blades held by novel means in a block. Both of these planes have problems in that while the blades are relatively rigid they are parallel and do not work properly when passed over a curving or angled surface. They tend to want to travel in a straight line and can unevenly gouge a substrate instead of smoothing it out. Since the blades are straight, they also tend to fill up with removed material and become inefficient.

SUMMARY OF THE INVENTION

Accordingly it is an object of the present invention to provide a newly improved rasp file. A rasp capable of being relatively rigid while allowing removed material to flow freely away from the work surface. Providing a rasp having teeth or sharp edges that remain sharp longer than typical rasps and is easily replaced with a new set of teeth.

DETAILED DESCRIPTION OF A PREFERRED EMBODIMENT

Figure 1:
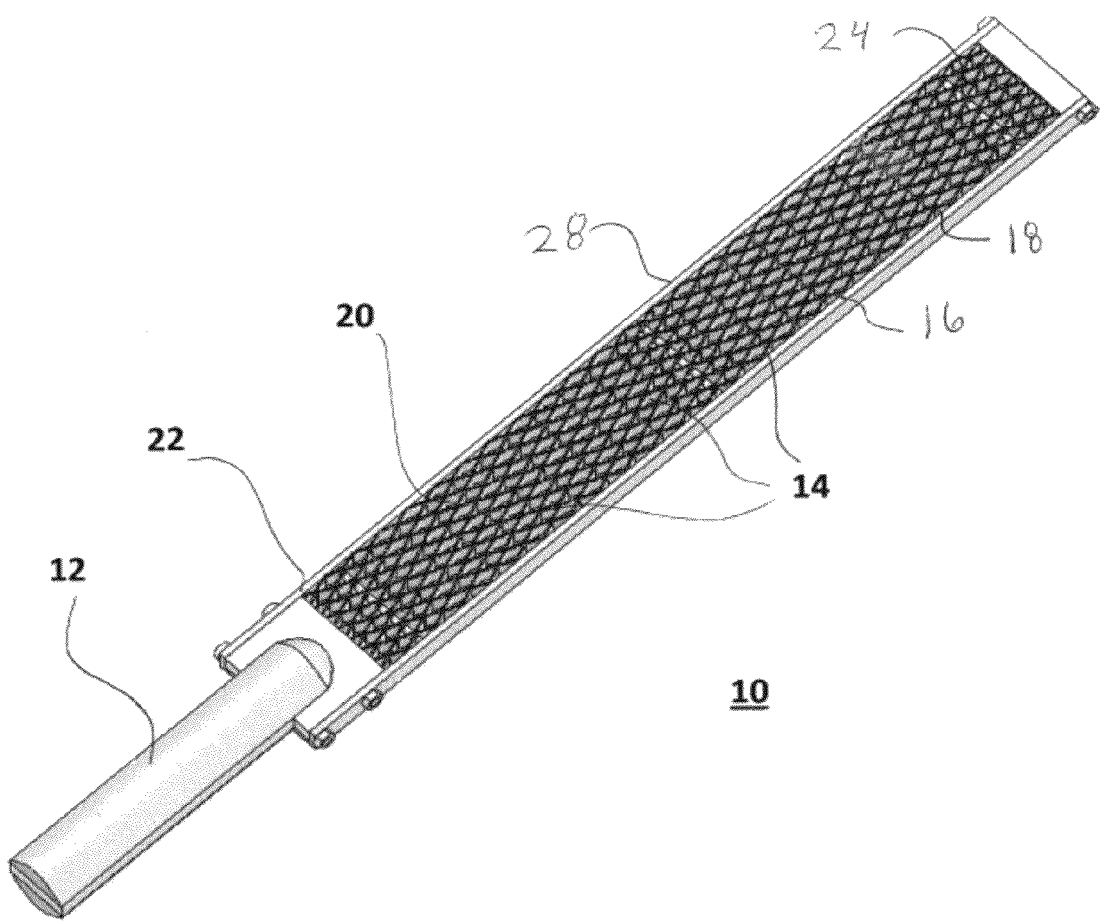
FIG. 1 is a pictorial illustration of a rasp according to the present invention.

With reference now to the drawing, and initially to FIG. 1, a rasp 10 type of file is shown. It is customary for a rasp 10 to have a handle 12 and a rasping plane or portion 14. There are many types of cutting edges that can be used. The preferred embodiment of the present invention includes a rasping plane 14 comprised of thin metal strips or blades 16 that have teeth 18 on at least one edge. As set forth in detail below, rasp 10 includes a handle 12, rasping media 20 and a carrier channel. or housing 22 connecting handle 12 and media 20.

Figure 2:
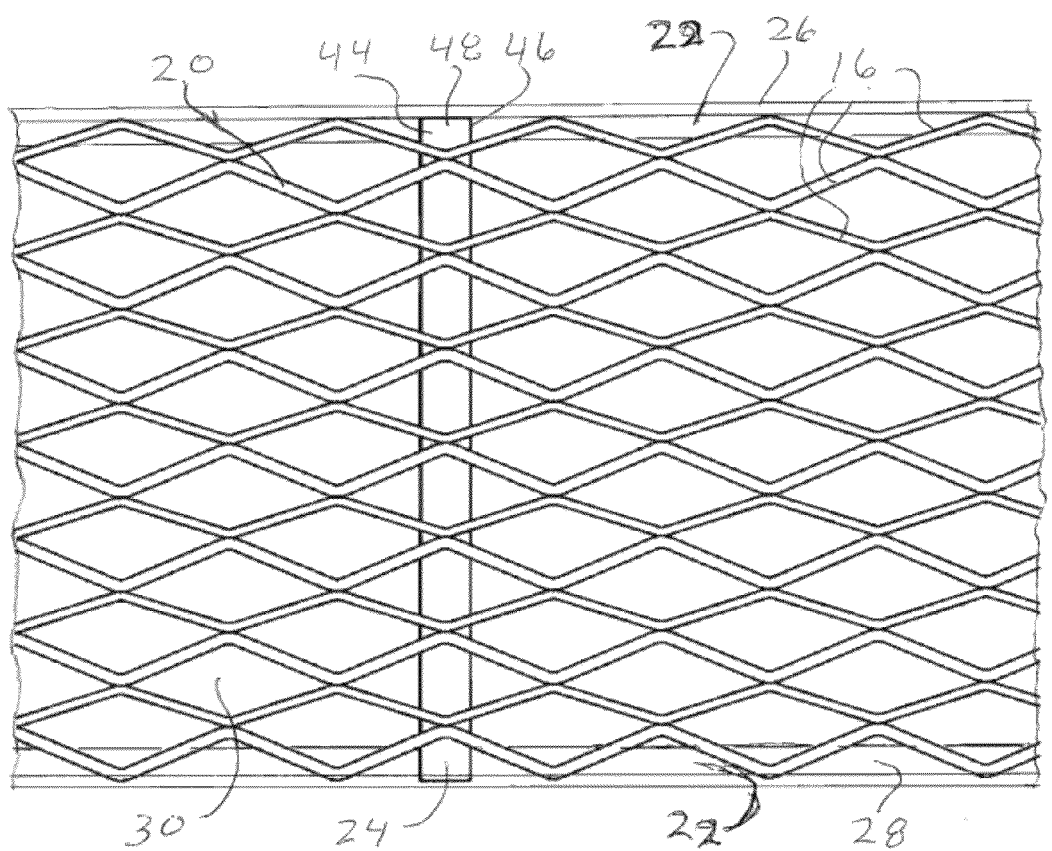
FIG. 2 is a top view of a section of the rasp showing a preferred blade pattern of the present invention.

Referring now to FIG. 2, rasping media 20 is shown in base channel or housing 22, shown from the top. Base channel 22 includes two side panels 26 and 28 leaving media openings free of obstruction thereby allowing removed material to freely flow therethrough. Rasp media 20 and channel 22 can be fastened together using a fastener 24 or other suitable means. It is important to note that diamond pattern media 30 provides a very open design allowing removed. material to be moved away from the surface being smoothed or shaped.

Figure 3:
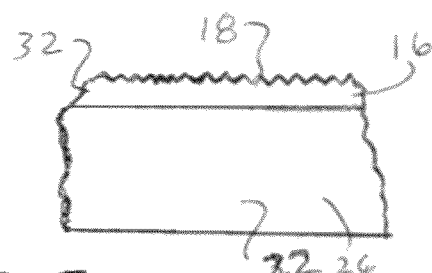
FIG. 3 is a partial side view of a side plate and a blade portion.
Figure 3A:
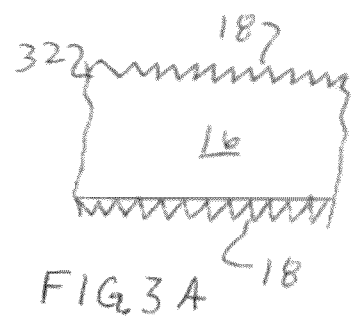
FIG. 3A is a partial side view of a blade having teeth on both edge portions.

As shown in FIGS. 3 and 3A, an edge portion 32 of blade 16 is formed with teeth 18 sized according to the size, shape, and type of material to be rasped. Generally, for an animal hoof, six to ten teeth per inch is appropriate. In this preferred embodiment, band saw blades are used as a base material. Band saw blades having a thickness of twenty five thousandths of an inch work well, although similar thicknesses can be used. Channel 22 and media 20 are fastened together such that edge portion 32 rises slightly above charnel side panels 26, 28. Specifically shown in FIG. 3A, each blade 16 can have teeth 18 on each of two edges providing a second rasp surface. Rasp media can then be reversed within the housing or carrier 22 presenting a fresh set of sharp teeth 18.

Figure 4:
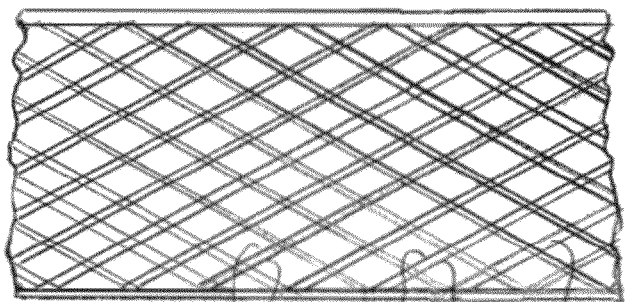
FIG. 4 is a top view of a section of the rasp showing a second preferred double blade pattern of the present invention.

As shown in FIG. 4, blades 16 can be paired together forming a blade couplet 34. Each blade 16 in a couplet 34 has teeth pointing in different directions so as to remove material when rasp 10 is moved in either longitudinal direction.

Figure 5:
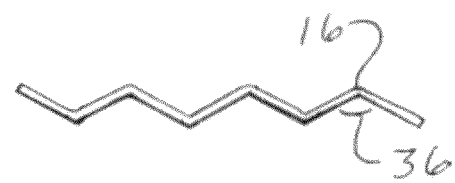
FIG. 5 is a simplified view of a blade bent in preparation for assembly.
Figure 6:
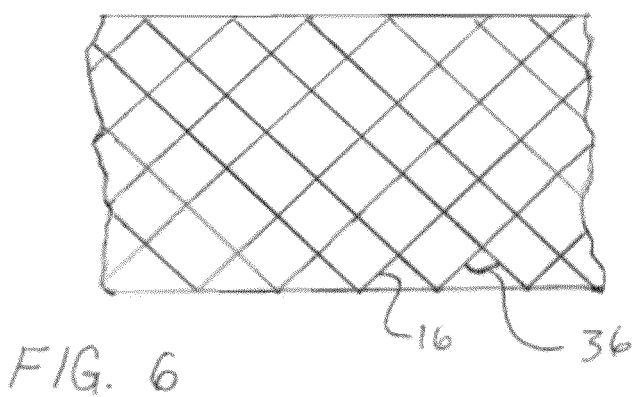
FIG. 6 is a partial sectional view showing rasp blades of the present invention in another preferred embodiment.

Shown in FIG. 5 is a simplified showing of a band saw blade 16 having been bent in an angular manner in preparation for assembly. While in the preferred embodiment each angle 36 is one hundred and twenty degrees, any angle allowing for an opening between blades 16 when assembled can be used. Shown in FIG. 6 is an example of blades 16 having an angle 36 of forty-five degrees.

Figure 7:
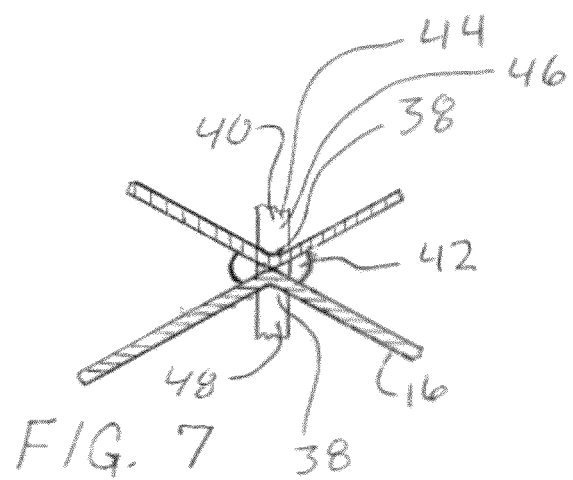
FIG. 7 is an enlarged sectional view of two blades and a fastening means therefor of the present invention.

Referring now to FIG. 7, an enlarged view of two blades 16 is shown. Once blades 16 are bent as described above, they are joined together at their respective bends 38. As shown, blades 16 can be joined together by any suitable means, such as a joining fastener 40 or by welding, forming welded joint 42. Joining fastener 40 can be a threaded fastener 44, a rivet 46, or in the preferred embodiment a roll pin 48. A hole to receive joining fastener 40 is preferably formed before blade 16 is bent. While blades 16 can be joined at each point 38, they only need to be joined at every twentieth bend.

Figure 8:
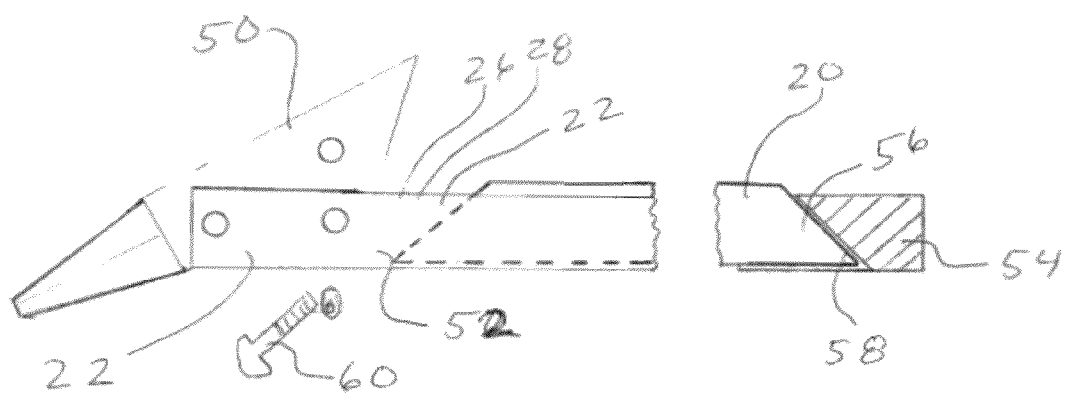
FIG. 8 is a side view, partially cut away, showing a preferred means for retaining rasp media within a housing channel.

In a preferred embodiment shown in FIG. 8, channel housing 22 includes a pivoting media holder 50 and fixed media holder 52. Fixed media holder 52 includes an angled portion 54 fastened within channel 22 and positioned to receive a matching angled end 56 of media 20 forming a retaining means 58. Pivoting media holder 50 is similarly angled to retain media 20 within channel 22 when retaining fastener 60 is placed through channel side panels 26, 28 and through pivoting media holder 50.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A rasp comprising a plurality of blades, said blades having cutting teeth on at least one edge portion thereof, said blades having a plurality of bends along a longitudinal axis such that when juxtaposed at their respective bends said blades form a diamond shaped pattern, said diamond shaped pattern being sized to allow passage therethrough of removed material and sufficiently rigid to prevent undue bending of the rasp, said rasp further including a pair of side rails sized to receive said blades and a fixed media holder located between an end portion of said side rails and a pivoting media holder positioned between said side rails at their opposite end from said fixed media holder.

2. The rasp of claim 1 comprising a handle, a frame, and a cutting media, said cutting media comprising blades having cutting teeth on at least one edge and forming a diamond pattern having at least three blades per inch in a transverse axis and at least three blades per inch in a longitudinal axis forming openings therebetween.

3. The rasp of claim 1 further comprising adjacent cutting teeth facing in opposite directions.

* * * * *